(12) United States Patent
Rayle

(10) Patent No.: US 12,440,949 B1
(45) Date of Patent: Oct. 14, 2025

(54) METHOD OF INSTALLING SCREEN ENCLOSURE CLIPS TO HANG OBJECTS

(71) Applicant: Keith E. Rayle, Daytona Beach, FL (US)

(72) Inventor: Keith E. Rayle, Daytona Beach, FL (US)

( * ) Notice: Subject to any disclaimer, the term of this patent is extended or adjusted under 35 U.S.C. 154(b) by 0 days.

(21) Appl. No.: 19/221,750

(22) Filed: May 29, 2025

Related U.S. Application Data

(62) Division of application No. 19/022,680, filed on Jan. 15, 2025.

(51) Int. Cl.
*F16M 13/02* (2006.01)
*B25B 27/14* (2006.01)
*B25G 1/04* (2006.01)

(52) U.S. Cl.
CPC ........... *B25B 27/146* (2013.01); *F16M 13/02* (2013.01); *B25G 1/04* (2013.01)

(58) Field of Classification Search
CPC ........... B25B 27/146; B25G 1/04; E06B 9/24; F16M 13/04; G03B 21/56
See application file for complete search history.

(56) References Cited

U.S. PATENT DOCUMENTS

2006/0221265 A1* 10/2006 Chen ..................... G03B 21/56
348/E5.131

* cited by examiner

*Primary Examiner* — Lee A Holly
(74) *Attorney, Agent, or Firm* — The Law Office of John R. Nelson, PA; John R. Nelson, Esq.

(57) ABSTRACT

A method is disclosed for installing a clip device within aluminum-framed screen enclosures to securely hang objects without altering the framing structure. The system includes a clip with integrated retention braces, spring tensioner curves, a slide top limiter, and an object retainer assembly. An angled installation tool with a clip retainer and alignment channel enables precise placement and removal of the clip, including in elevated or hard-to-reach locations. The method provides a tool-less, damage-free installation approach for supporting decorative or functional items such as lights, plants, and curtains, enhancing the utility and appearance of patio and pool enclosures.

14 Claims, 17 Drawing Sheets

METHOD OF INSTALLING SCREEN ENCLOSURE CLIPS TO HANG OBJECTS

CROSS-REFERENCE TO RELATED APPLICATIONS

This application is a divisional of U.S. patent application Ser. No. 19/022,680, filed Jan. 5, 2025, the entire contents of which are hereby incorporated by reference.

FIELD OF INVENTION

The present disclosure relates to a clip device and installation tool for hanging objects within screen enclosures.

BACKGROUND

The following discussion is not to be deemed admitted prior art, but merely related art to show possible background and information related to devices or systems for hanging objects within screen enclosures with a clip device and installation tool.

Screen enclosures, as used herein, may be but not limited to, patio enclosures, pool enclosures, lanai enclosures, sunrooms, screened porches, and mosquito nets.

Aluminum framing, as used herein, may be but not limited to, extruded aluminum profiles, aluminum posts, aluminum beams, aluminum rails, aluminum channels, and aluminum structural supports.

Hanging objects, as used herein, may be but not limited to, decorative lights, plants, wind chimes, fans, speakers, curtains, and ornaments.

Extension tools, as used herein, may be but not limited to, extension poles, telescoping handles, clip device applicators, mounting devices, and installation aids.

To illustrate examples of potential embodiments without limiting their scope, the following description will discuss the use of the clip device and installation tool in hanging objects within screen enclosures. Decorative lights and pool enclosures are used as examples, but it should be understood that the invention can be applied to other hanging objects and different types of screen enclosures.

Screen enclosures are commonly used in residential settings to enclose patios and pools, providing protection from insects and debris while allowing outdoor enjoyment. These enclosures typically consist of aluminum framing with screen mesh panels. Homeowners often desire to hang decorative items, such as lights or plants, within these enclosures to enhance the ambiance and functionality of the space.

Traditionally, hanging objects within screen enclosures has presented challenges. The aluminum framing does not readily allow for attachment of hooks or other hanging hardware without modification. Drilling holes or making permanent alterations to the framing can compromise its structural integrity and may void warranties.

Typically, a solution is to use adhesive hooks or tape to attach objects to the framing. However, these methods often lack the strength to securely hold heavier items, especially in outdoor conditions with temperature fluctuations and humidity. Additionally, adhesives may damage the finish of the aluminum framing when removed.

Still, other solutions involve using specialized clamps designed to grip the framing. While these can provide a more secure hold, they are often bulky and visually obtrusive. Furthermore, clamps may not fit properly on all framing profiles, limiting their versatility across different enclosure designs.

Each of these solutions fails to meet the needed solution because they either lack adequate strength, require permanent modifications, potentially damage the framing, or have limited compatibility with various enclosure designs. Additionally, installation of these solutions often requires the use of ladders or lifts to reach high areas of the enclosure, posing safety risks and inconvenience for users.

Therefore, a need exists for a novel clip device and installation tool to securely hang objects within screen enclosures.

BRIEF SUMMARY OF THE INVENTION

This invention relates to methods of installing clips within patio and pool screen enclosures to securely hang objects without modifying the existing aluminum framing.

Numerous aspects of a unique clip device and installation tool for hanging objects within screen enclosures are disclosed.

It is desirable to have a method of installing screen enclosure clips to hang objects and keep the objects securely in place without drilling holes or making permanent modifications to the enclosure framing. Additionally, it allows for easy installation and removal at various heights without requiring ladders or lifts. Still further, it is desirable to have a clip device and installation tool that can be used with existing enclosure designs and accommodate different object weights and sizes.

The disclosed clip device and installation tool advantageously fills these needs and addresses the aforementioned deficiencies by providing a clip device and installation tool that securely attaches to standard aluminum framing channels and allows objects to be hung at various heights with minimal effort.

BRIEF DESCRIPTION OF THE DRAWINGS

A method of installing screen enclosure clips to hang objects is illustrated by way of example, and not by way of limitation, in the figures of the accompanying drawings.

While aspects of a method of installing screen enclosure clips to hang objects will be described with reference to the details of the embodiments of the invention shown in the drawings (and some embodiments not shown in the drawings), these details are not intended to limit the scope of the invention.

LIST OF FIGURE ITEMS

Figure 1:
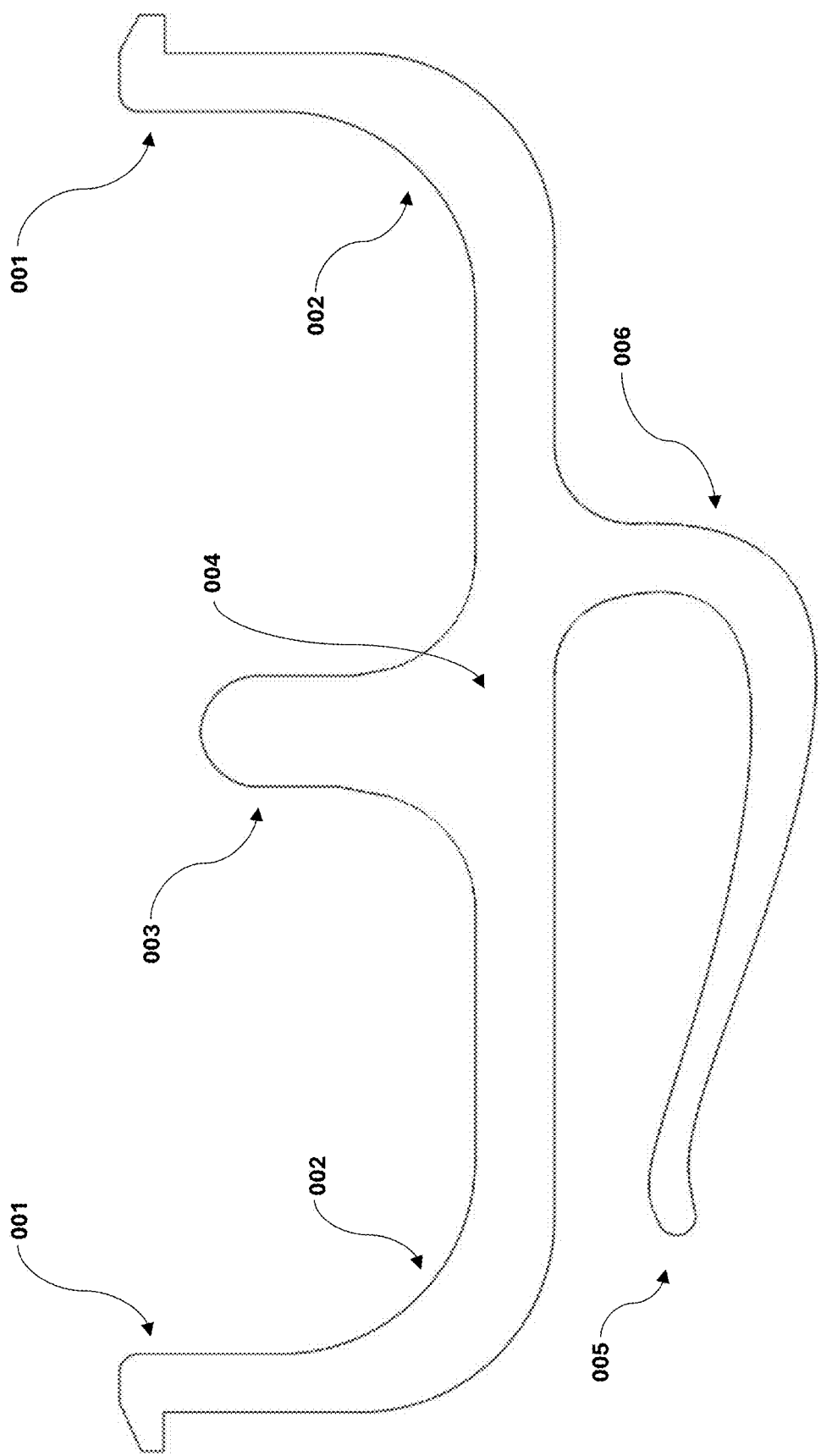
FIG. 1. An orthogonal side view of a clip device with multiple components, according to aspects of the present disclosure.

001 retention brace
002 spring tensioner curve
003 slide top limiter
004 component body
005 object retainer spring
006 object retainer
007 installation slot
008 angled tool head assembly
009 clip device retainer
010 clip device retention wall
011 clip device retention channel
012 clip device retention stop
013 clip device installation tool body
014 object hanging channel
015 extension tool
016 typical fastener
017 framing channels
018 framing

DETAILED DESCRIPTION

The order of the steps in the disclosed processes may be altered within the scope of the invention.

In conjunction with the accompanying drawings, the following detailed description provides a more specific and detailed explanation of various embodiments of the method of installing screen enclosure clips to hang objects. These embodiments are provided to illustrate the invention but should not be seen as limiting its scope; the invention can be embodied in many different forms and is intended to be thorough and comprehensive to those skilled in the art.

For the purposes of promoting an understanding of the principles of a method of installing screen enclosure clips to hang objects, reference will now be made to the embodiments illustrated in the drawings and specific language will be used to describe the same, only as examples and not intended to be limiting.

The present disclosure relates to a method of installing screen enclosure clips to hang objects. This system may provide a convenient and secure method for attaching various items to the structural framing of screen enclosures, such as those commonly used for patios and pools. The clip device may be designed to securely attach to aluminum framing channels without requiring permanent modifications to the structure.

In some cases, the clip device may be available in different colors to match the color of the pool cage or screen enclosure. This color matching capability may allow the clip device to blend seamlessly with the existing structure, maintaining the aesthetic appearance of the enclosure.

The clip device and installation tool system may be particularly useful for hanging decorative lights within screen enclosures. In addition to lights, the system may accommodate a variety of other objects, providing versatility in its applications. The ability to easily install and remove the clips may allow users to change decorations or lighting arrangements as desired without damaging the enclosure structure.

The installation tool may be designed to work in conjunction with the clip device, facilitating easy and secure placement of the clip devices on the aluminum framing, even in hard-to-reach areas of the enclosure. This tool may enable users to install clip devices at various heights and angles within the screen enclosure structure.

The clip device may be designed to securely attach to aluminum framing channels commonly found in screen enclosures. In some cases, the clip device may include several components working together to provide a secure and adjustable mounting solution.

A clip device and installation tool may be constructed from various materials, including but not limited to plastic, acrylic, nylon, PET, ABS, metal, carbon fiber, polypropylene, high density polyethylene, polystyrene, polyethylene, high impact polystyrene, polyvinyl chloride, acrylic, acrylonitrile butadiene styrene, polycarbonate, nylon, polyurethane, polyetherimide, polyether ether ketone, and polyphenylene sulfide. The choice of material can affect properties such as durability, flexibility, and weight capacity.

In some cases, the clip device may be designed for different sizes of square aluminum tubing, ranging from 25.4 mm to 203.2 mm (1 inch to 8 inches).

The clip device thickness may vary, not meant to be limiting, from 12.7 mm to 5.08 mm (0.5 to 0.2 inches), with an average thickness of 2.54 mm (0.1 inches).

The clip device dimensions, not meant to be limiting, are approximately 45.72 mm long, 12.7 mm wide, and 22.86 mm tall (1.8 inches long, 0.5 inches wide, and 0.9 inches tall). These are dimensions for standard 50.8 mm (2 inch) aluminum frames. However, the dimensions may change based on production methods, the use case of the clip (i.e., heavier or lighter objects), manufacturing materials, and the environment where the clip device is deployed.

A second version of the clip device dimensions may be, not meant to be limiting, approximately 45.72 mm long, 25.4 mm wide, and 22.86 mm tall (1.8 inches long, 1 inch wide, and 0.9 inches tall).

The installation tool dimensions may be, not meant to be limiting, approximately 25.4 mm in diameter, 33.02 mm tall, and have a 19.05 mm outside diameter with five threads per 25.4 mm (1 inch in diameter, 1.3 inches tall, and have a 0.75 inch outside diameter with five threads per inch).

The clip device may feature a retention brace 001 positioned at both ends of the assembly. These braces 001 provide structural support and allow the clip device to securely attach to aluminum framing channels 017. The retention braces 001 may be symmetrically arranged to ensure balanced force distribution.

A spring tensioner curve 002 may extend from each retention brace 001. This curved section contributes to the clip device's tensioning mechanism, allowing it to maintain a secure grip within the framing channel 017. The spring tensioner curve 002 may be engineered to provide optimal tension for various object weights.

The clip device may include a slide top limiter 003 positioned above the component body 004. This feature helps maintain the clip device's placement on the aluminum framing 018, particularly when the framing is slanted. The slide top limiter 003 may be designed to rest against protruding screws in the framing, preventing unwanted movement.

A component body 004 may form the central structure of the clip, connecting and supporting the other components. The component body may vary in length to accommodate different sizes of aluminum framing profiles.

The clip device may incorporate an object retainer spring 005 and object retainer 006 to securely hold items. These components may be oriented parallel or perpendicular to the main body axis, allowing for different mounting configurations. The object retainer spring 005 may be tapered to accommodate objects of varying thicknesses.

An installation slot 007 may be included in some clip device variations, providing an interface point for the installation tool. This slot 007 may be positioned between the object retainer spring 005 and the component body 004, facilitating easy attachment and removal of the clip device.

An installation tool may comprise an angled tool head assembly 008 designed to hold and position the clip device during installation. The angle of this assembly may be optimized to allow proper insertion of the clip device into aluminum framing channels.

The installation tool may feature a clip device retainer 009 extending from the angled tool head assembly. This component may be shaped to securely hold the clip device during the installation process, preventing it from falling or shifting.

Clip device retention walls 010 may be incorporated into the installation tool, providing lateral support and stability during clip device installation. These walls may be designed to accommodate various clip device sizes and prevent lateral movement during the installation process.

A clip device retention channel 011 may be formed within the installation tool, providing a designated area for clip device placement. This channel may be sized to fit standard clip device dimensions while allowing for easy insertion and removal.

The installation tool may include a clip device retention stop 012 positioned at the rear of the clip device retention channel. This feature may limit backward movement of the clip device during installation, ensuring proper positioning.

A clip device installation tool body 013 may form the main structural support of the installation tool. This body may be designed to provide stability during use and may include features for attaching to extension poles or other handling devices.

Figure 2:
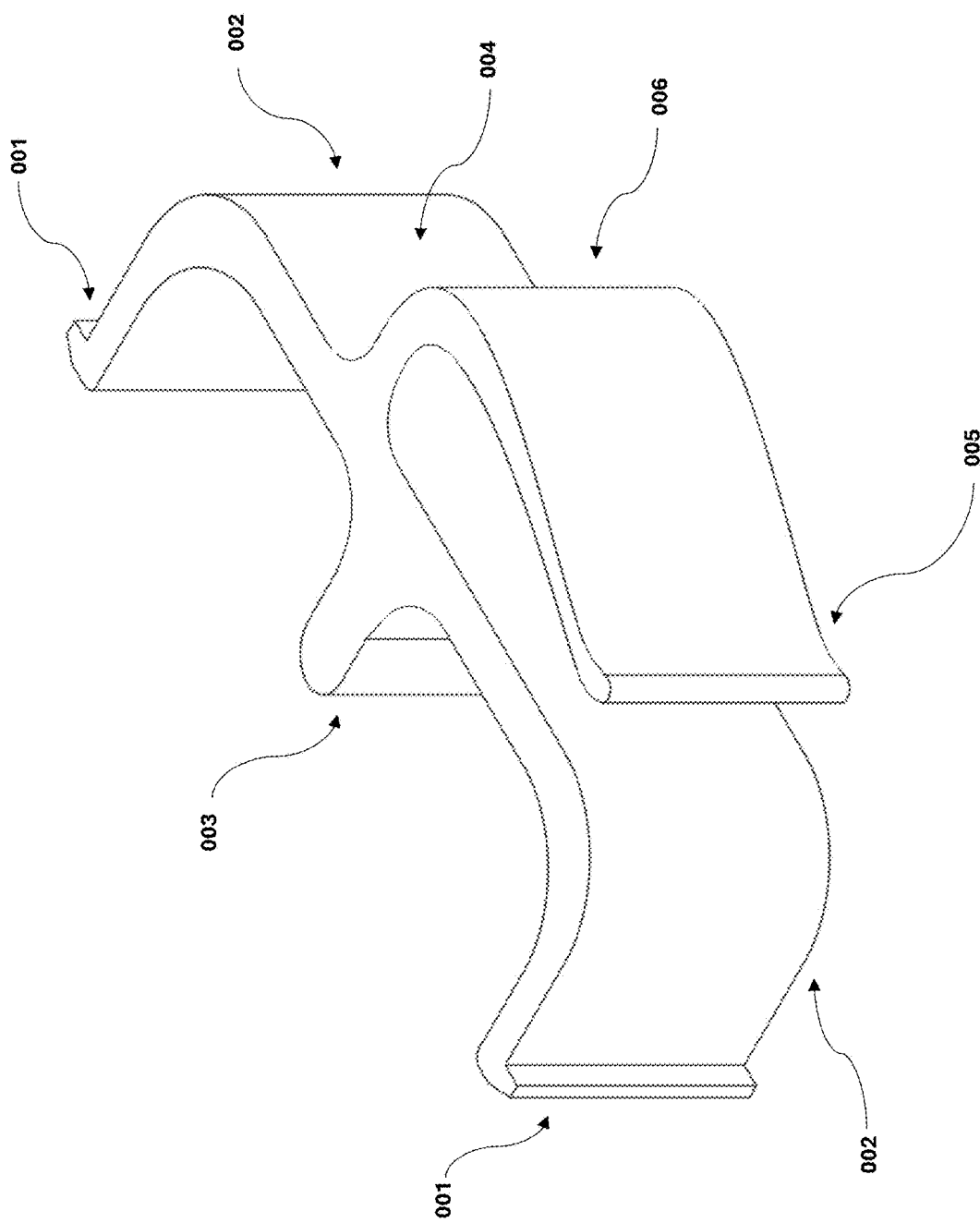
FIG. 2. An isometric view of the clip device, showing the three-dimensional arrangement of components, according to an embodiment.

Referring to FIG. 1, the clip device may include a retention brace 001 positioned at both ends of the assembly. A spring tensioner curve 002 may extend from each retention brace 001, as shown in FIG. 2. The spring tensioner curve 002 may contribute to the clip's tensioning mechanism, allowing it to maintain a secure grip within the framing channel. In some cases, the spring tensioner curve 002 may be engineered to provide optimal tension for various object weights, up to 6 pounds.

Figure 3:
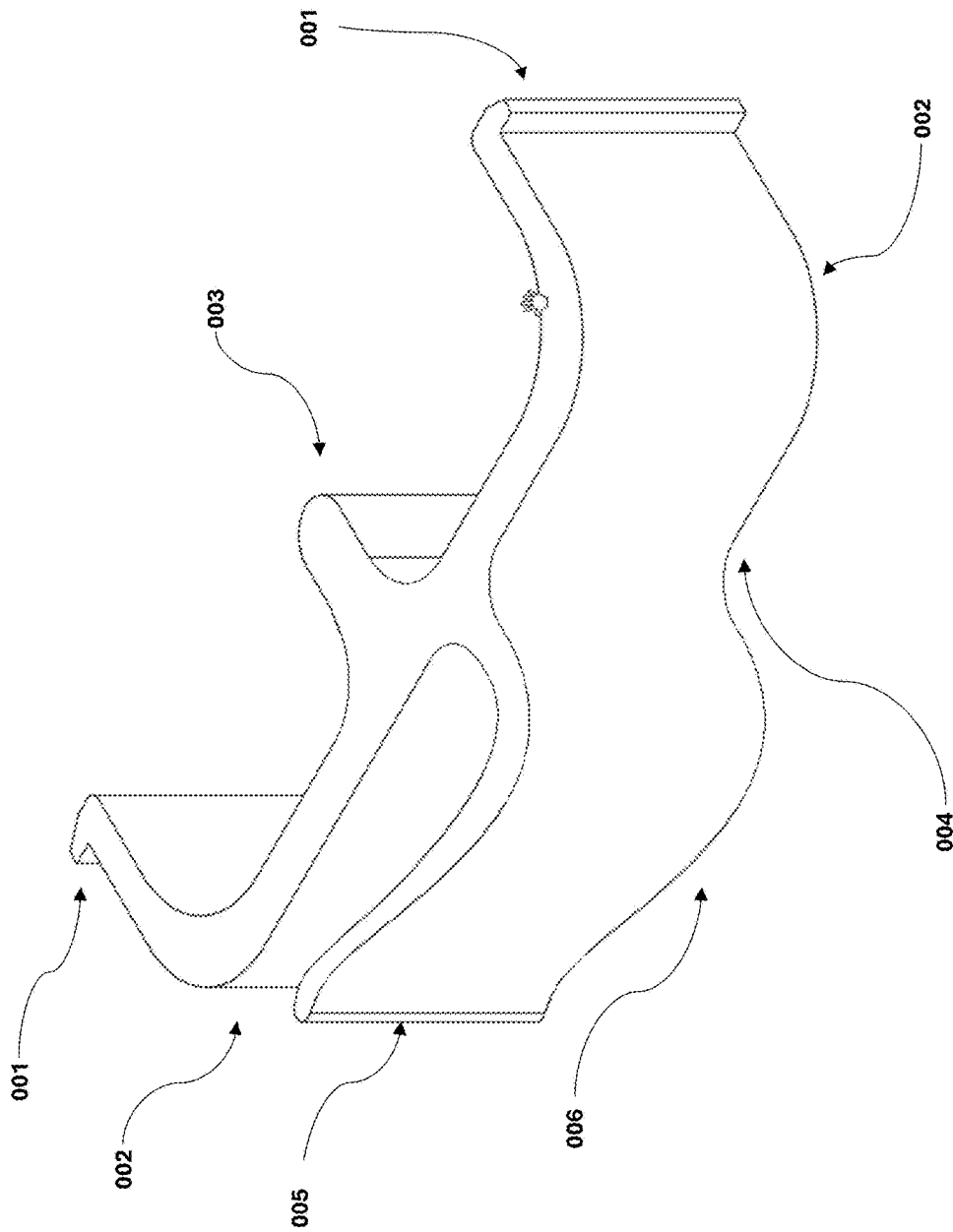
FIG. 3. An isometric view of the clip device, showing the three-dimensional arrangement of components, according to an embodiment.

The clip device may include a slide top limiter 003 positioned above a component body 004, as illustrated in FIGS. 1, 2, 3. The slide top limiter 003 may help maintain the clip's placement on the aluminum framing, particularly when the framing is slanted. The component body 004 may form the central structure of the clip, connecting and supporting the other components.

Referring to FIGS. 1, 2, 3, 4, the clip device may incorporate an object retainer spring 005 and an object retainer 006 to securely hold items. In this first variation, the object retainer spring 005 and object retainer 006 may be oriented parallel to the main body axis.

Figure 11:
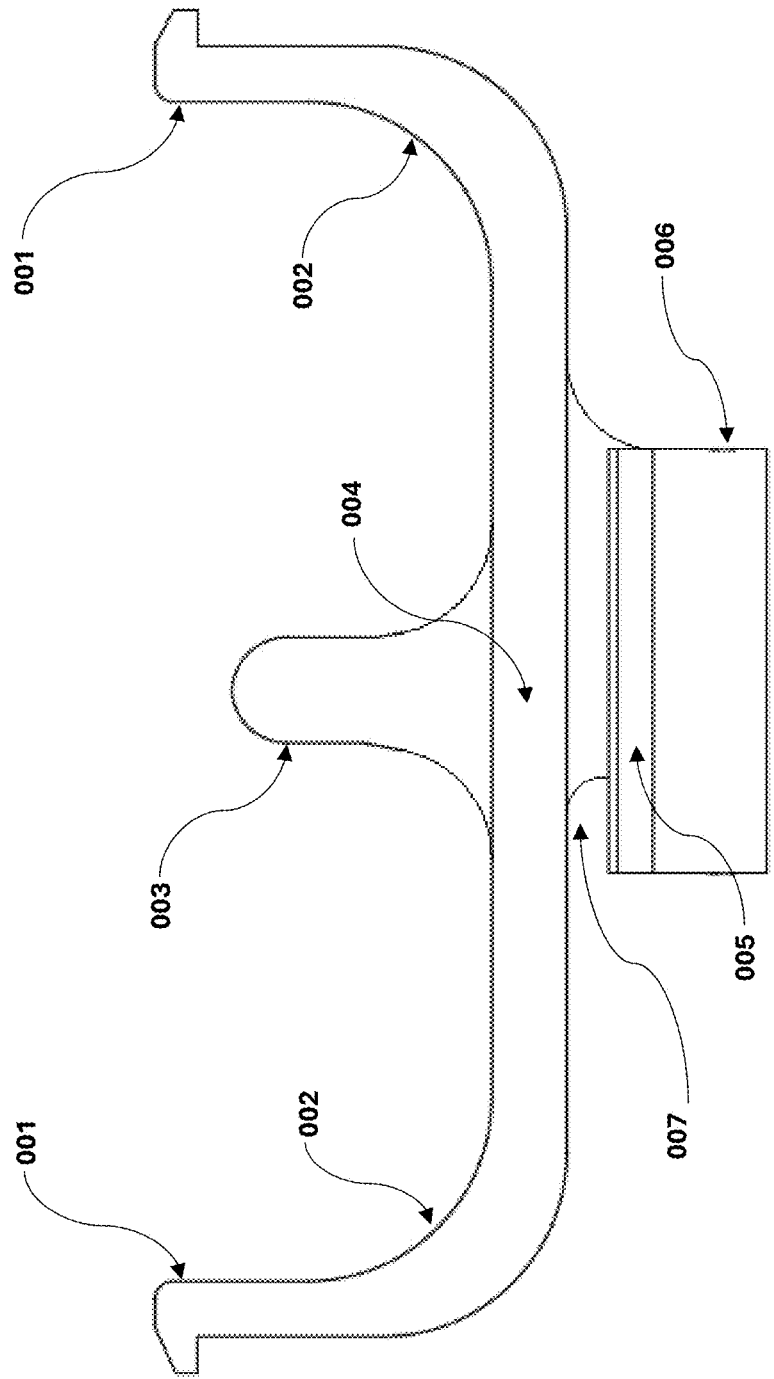
FIG. 11. An orthogonal side view of the clip device in a modified configuration with a perpendicular object retainer, according to an embodiment.
Figure 12:
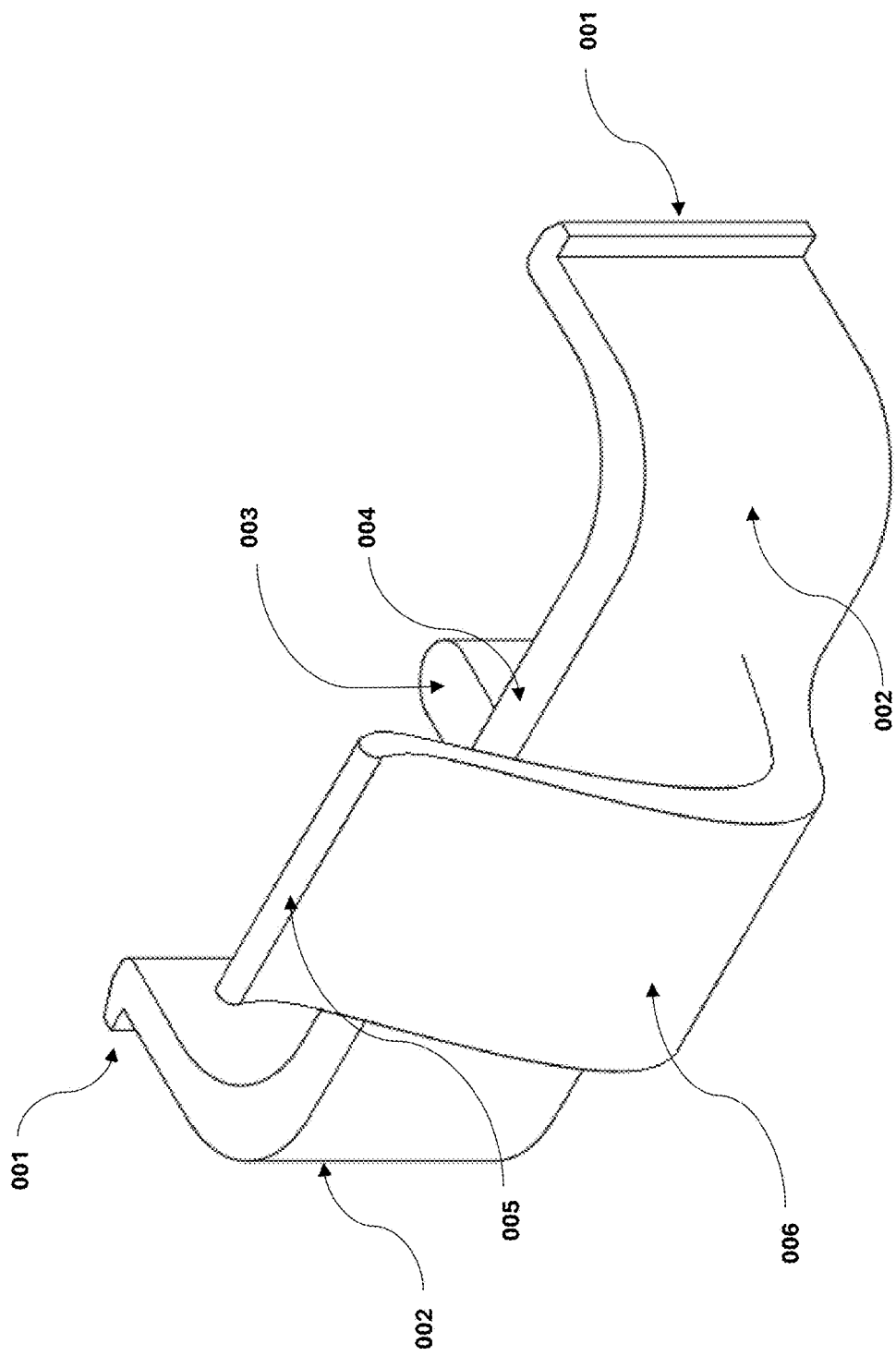
FIG. 12. An isometric view of the clip device in a modified configuration with a perpendicular object retainer, according to an embodiment.
Figure 13:
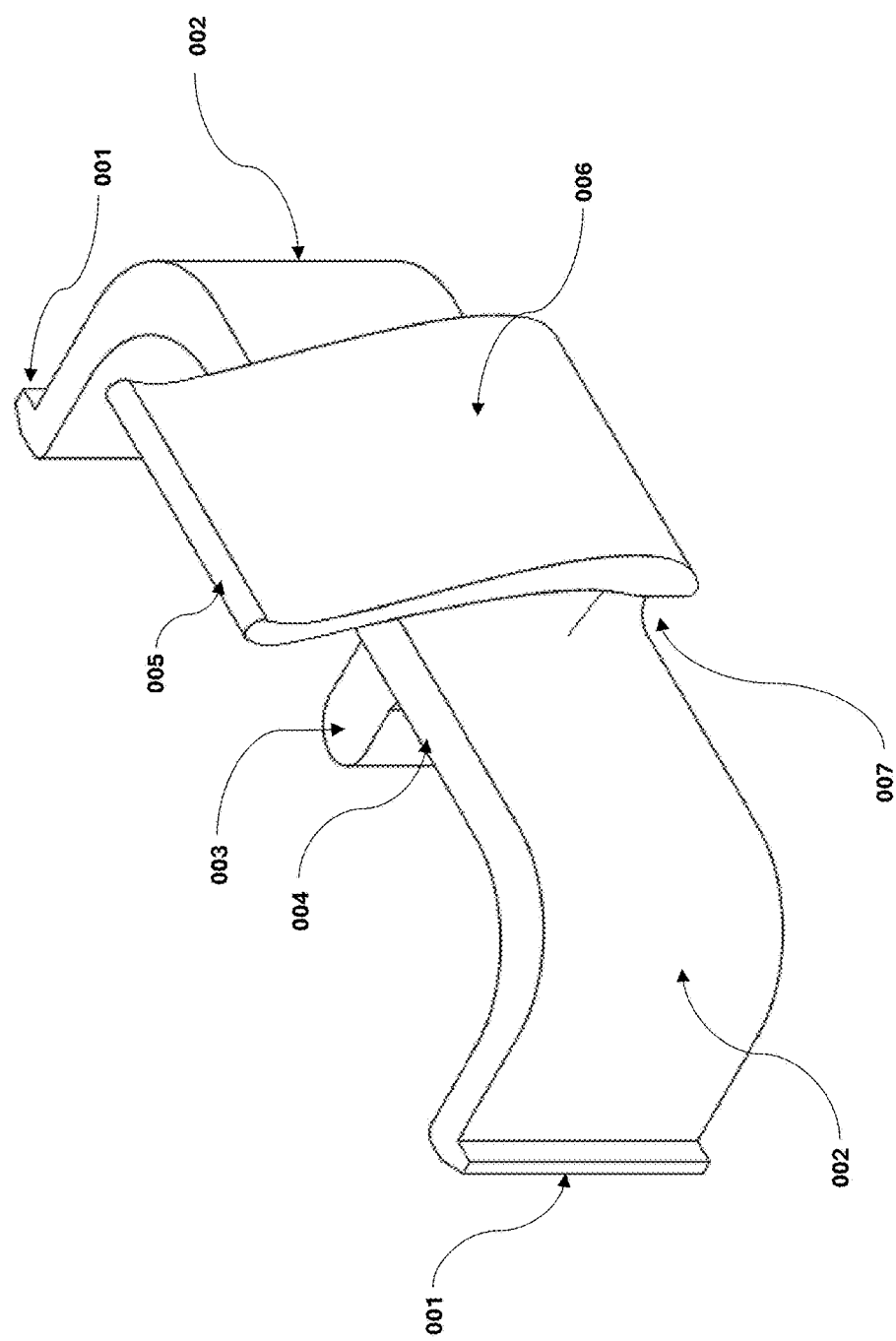
FIG. 13. An isometric view of the clip device in a modified configuration with a perpendicular object retainer, according to an embodiment.

As illustrated in FIGS. 11, 12, 13, the second variation of the clip device may feature the object retainer spring 005 and object retainer 006 oriented perpendicular to the main body axis. This perpendicular orientation may allow for different mounting configurations and accommodate various types of objects.

A second variation of the clip device is shown in FIG. 11. In this variation, an installation slot 007 may be included, providing an interface point for an installation tool. The installation slot 007 may be positioned between the object retainer spring 005 and the component body 004, facilitating easy attachment and removal of the clip.

Figure 6:
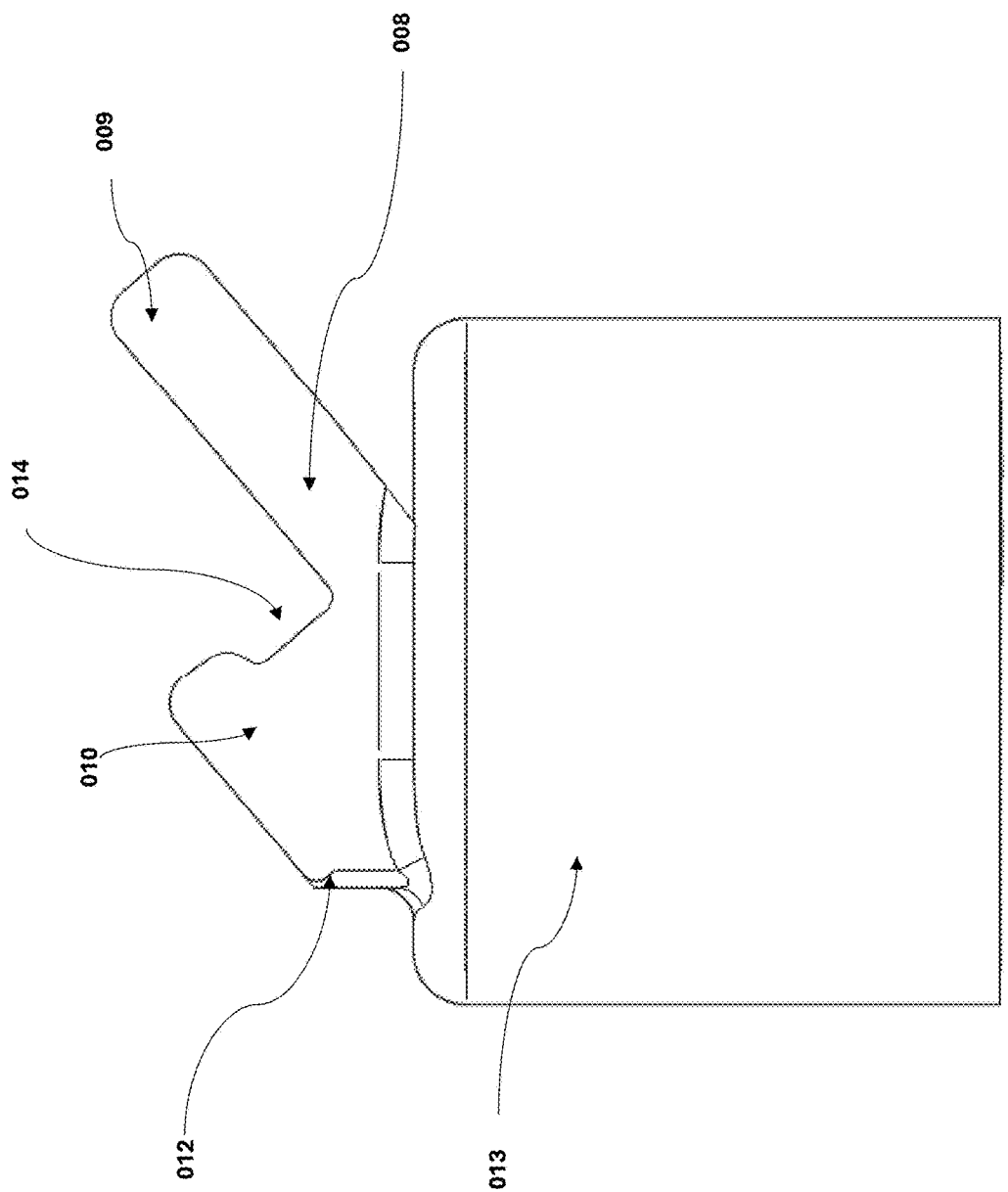
FIG. 6. An orthogonal side view of an installation tool for mounting clip devices, according to aspects of the present disclosure.

The installation tool may be designed to facilitate the easy installation and removal of clip devices within screen enclosures. Referring to FIG. 6, the installation tool may comprise an angled tool head assembly 008 positioned at the upper portion of the device. The angled tool head assembly 008 may extend outward at an angle from the main body structure, allowing for proper positioning during clip device installation.

Figure 7:
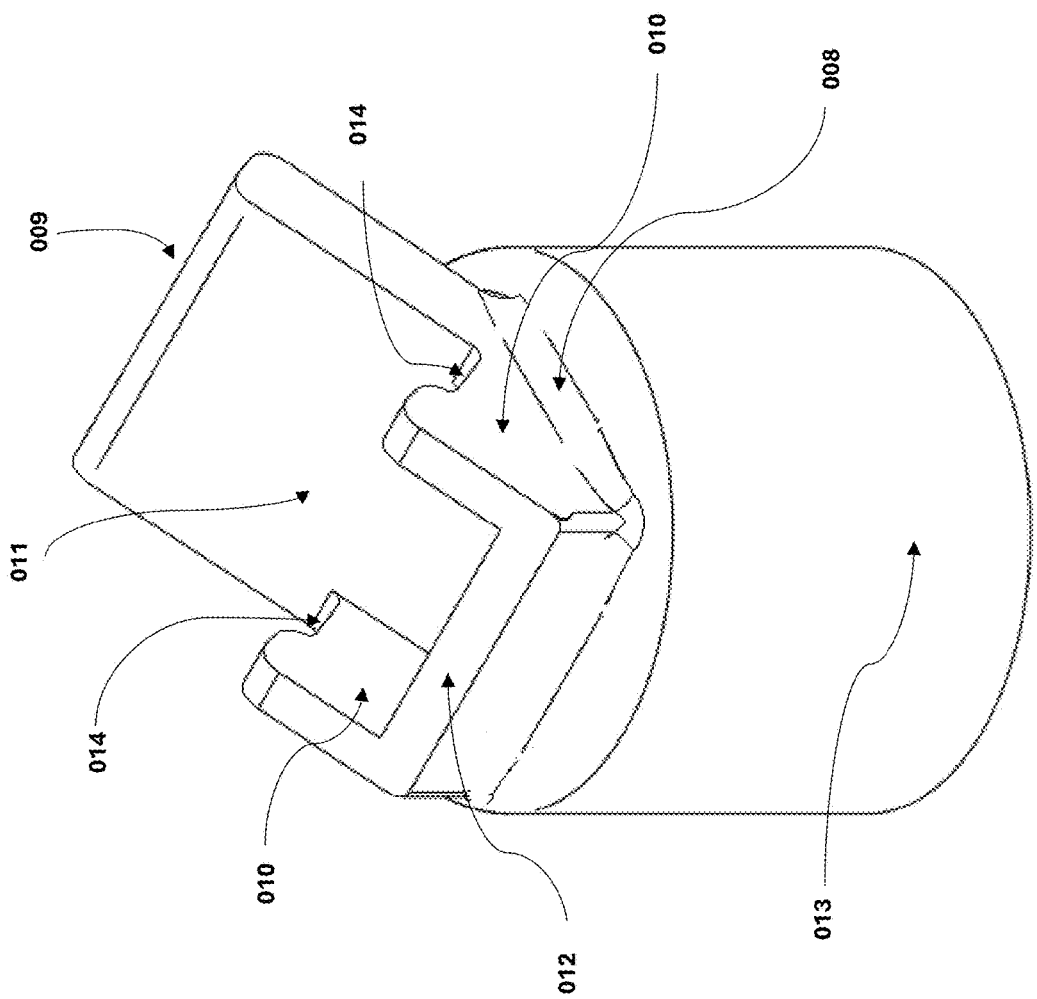
FIG. 7. An isometric view of the installation tool for mounting clip devices, according to an embodiment.

As shown in FIG. 7, a clip device retainer 009 may be located at the end of the angled tool head assembly 008. The clip device retainer 009 may feature a curved profile designed for engaging with clip devices, providing a secure hold during the installation process. Two clip device retention walls 010 may be positioned on opposite sides of the angled tool head assembly 008, creating a channel between them. This channel, referred to as the clip device retention channel 011, may provide a designated area for clip device placement during installation.

Figure 8:
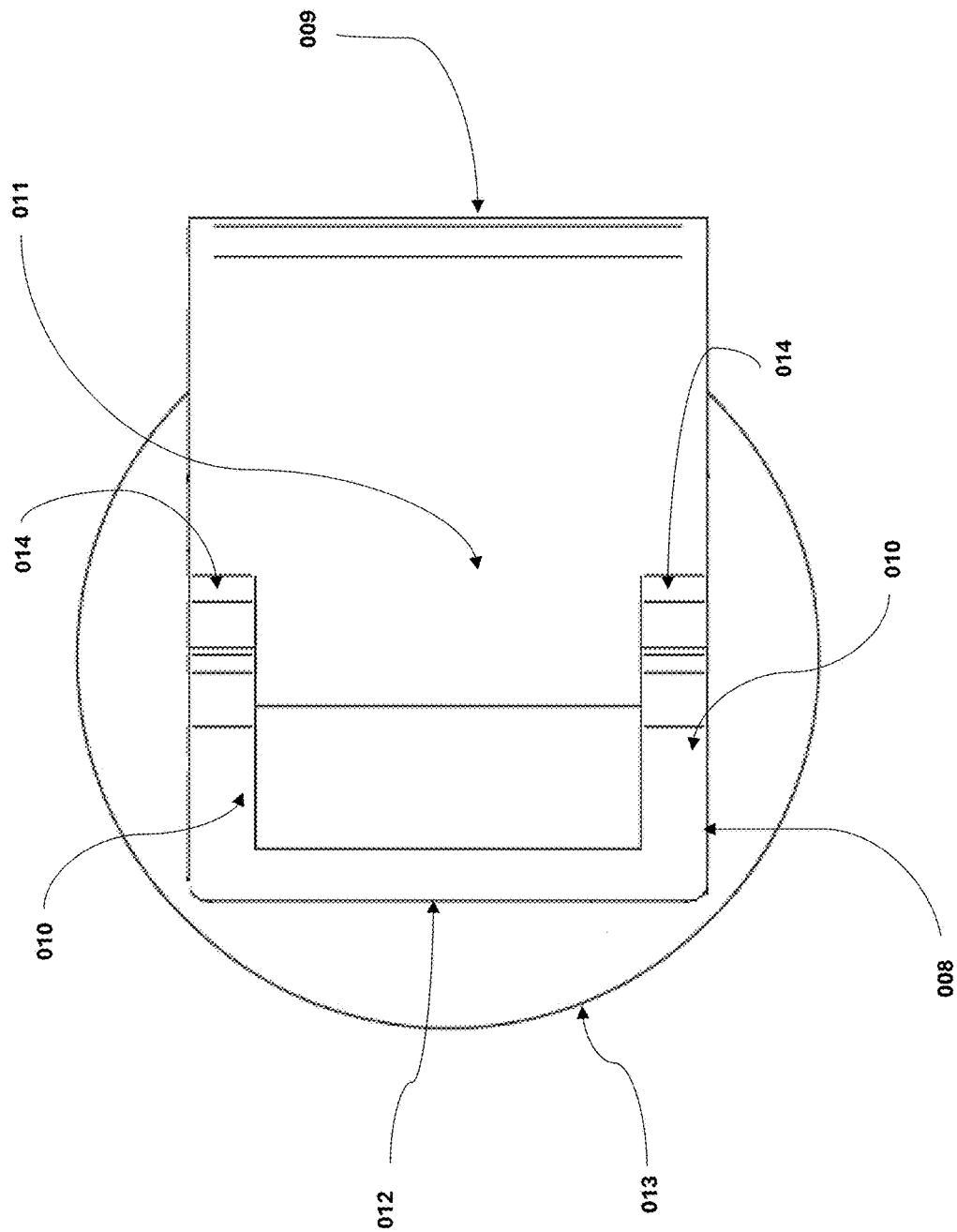
FIG. 8. A top orthogonal view of the installation tool assembly, according to aspects of the present disclosure.

FIG. 8 illustrates a top orthogonal view of the installation tool, showing the arrangement of components within the angled tool head assembly 008. The clip device retention stop 012 may be positioned at the rear of the clip device retention channel 011, limiting backward movement of the clip device during installation to ensure proper positioning.

Figure 9:
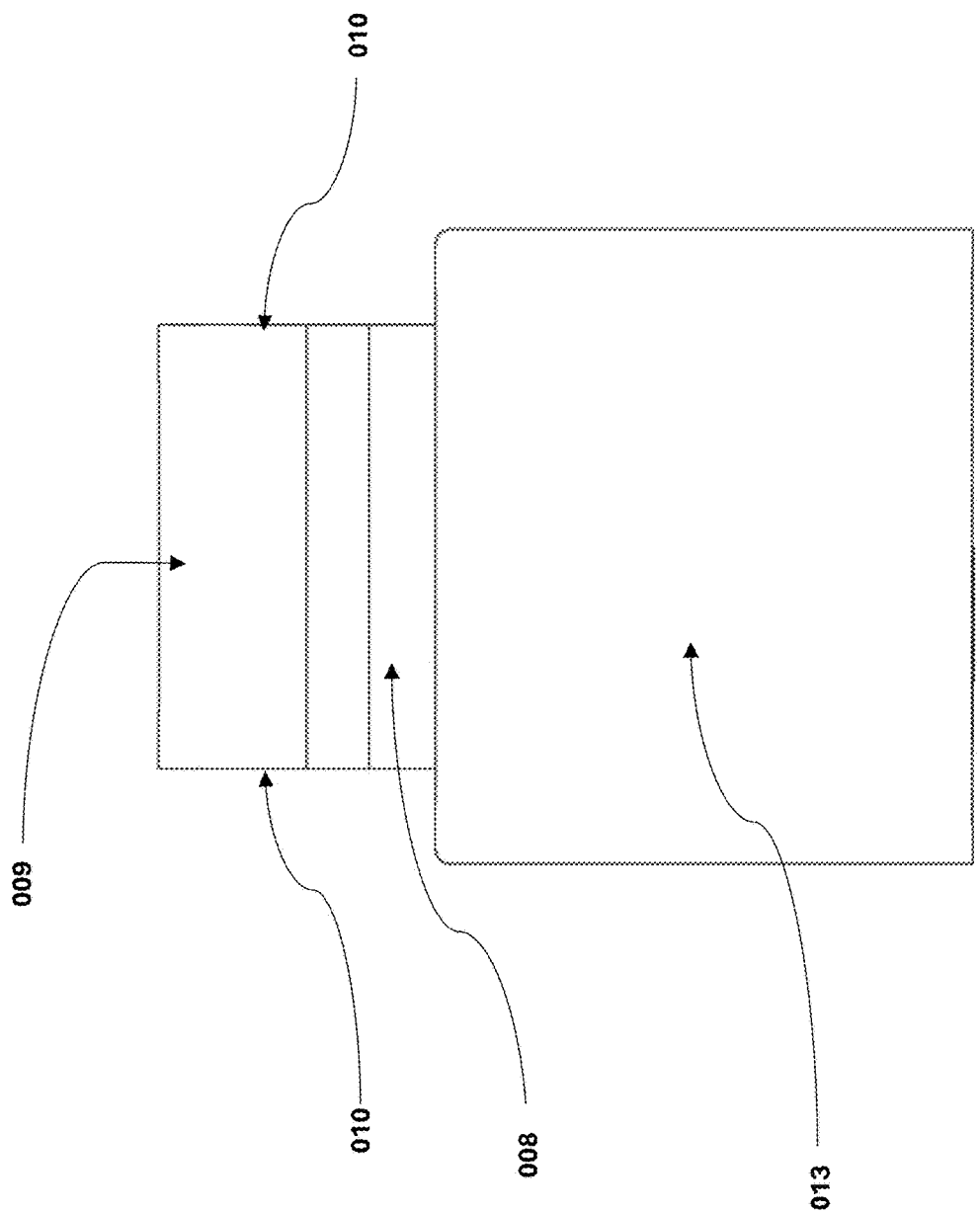
FIG. 9. An orthogonal side view of the installation tool assembly, according to an embodiment.

Referring to FIG. 9, the installation tool may include a clip device installation tool body 013 that forms the main vertical structure of the tool. The clip device installation tool body 013 may provide stability and support during operation, serving as the primary handling surface for the user.

Figure 10:
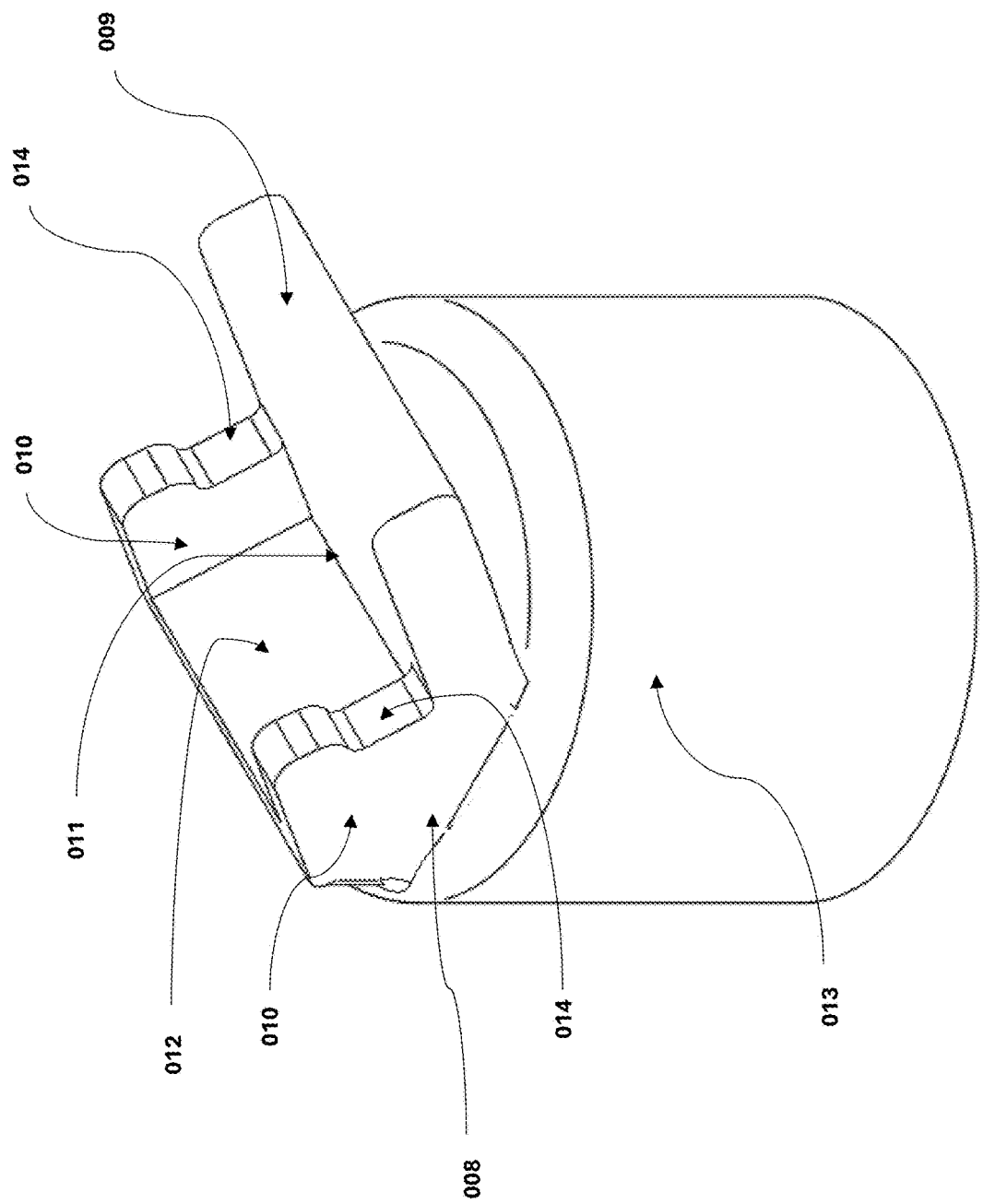
FIG. 10. An isometric view of the installation tool assembly, illustrating component relationships, according to aspects of the present disclosure.

In some cases, the installation tool may be designed to attach to a telescoping extension pole. This feature may allow users to install clip devices at various heights within a screen enclosure, even in hard-to-reach areas. FIG. 10 shows an isometric view of the installation tool, illustrating how the components work together to form a functional device for clip device installation.

The angled tool head assembly 008 may be designed to hold and position the clip device during installation. The angle of this assembly may be optimized to allow proper insertion of the clip device into aluminum framing channels commonly found in screen enclosures. The clip device retainer 009 may securely hold the clip device during the installation process, preventing it from falling or shifting.

The clip device retention walls 010 may provide lateral support and stability during clip device installation. These walls may be designed to accommodate various clip device sizes and prevent lateral movement during the installation process. The clip device retention channel 011 may be sized to fit standard clip device dimensions while allowing for easy insertion and removal.

In some cases, the installation tool may be compatible with both variations of the clip device described earlier. The tool may be designed to work with clips featuring the installation slot 007, allowing for secure attachment during the installation process. The clip device retention stop 012 may ensure that the clip device is properly positioned within the tool before installation.

The clip device installation tool body 013 may be engineered to provide optimal balance and control during use. In some cases, this body may include features for attaching to extension poles or other handling devices, enhancing the tool's versatility and reach.

The clip device and installation tool may work together to provide a secure and efficient method for hanging objects within screen enclosures. In some cases, the installation process may begin with the user attaching the installation tool to a telescoping extension pole, allowing for easy access to various heights within the enclosure.

Referring to FIG. 6, the user may insert a clip device into the angled tool head assembly 008 of the installation tool. The clip device retainer 009 may securely hold the clip device in place during the installation process. A clip device retention wall may provide lateral support, preventing the clip device from shifting during installation.

The user may then position the installation tool near the desired location on the aluminum framing of the screen enclosure. The angled design of the angled tool head assembly 008 may allow for proper alignment of the clip device with the framing channel.

As shown in FIG. 1, the retention brace 001 of the clip device may be inserted into the framing channel. The spring tensioner curve 002 may compress slightly during insertion, creating tension that helps secure the clip device in place. The slide top limiter 003 may prevent the clip device from sliding down slanted framing by resting against protruding screws in the frame.

In some cases, the user may apply gentle pressure to the clip device installation tool body 013, pushing the clip device fully into the framing channel. The clip device retention stop 012 may ensure that the clip device is inserted to the correct depth.

Once the clip device is securely in place, the user may gently pull the installation tool away, leaving the clip device attached to the framing. The component body 004 of the clip device may provide a stable base for hanging objects.

For clips featuring the installation slot 007, as shown in FIG. 11, the installation process may be similar. The installation slot 007 may interface with the clip device retainer 009 of the installation tool, providing additional stability during the installation process.

To hang objects, the user may insert the item into the space between the object retainer spring 005 and the object retainer 006. The spring tension may securely hold the object in place.

Removal of the clip device may be accomplished by reversing the installation process. The user may position the installation tool over the installed clip, aligning the clip device retainer 009 with the clip. Gentle pressure may be applied to engage the clip, and then the tool may be pulled away from the framing, removing the clip.

In some cases, the clip device retention channel 011 of the installation tool may accommodate different sizes or variations of clip devices, allowing for versatility in hanging various objects within the screen enclosure.

Referring to FIG. 1, the clip device may comprise multiple components arranged in a specific configuration. The retention brace 001 may be positioned at both ends of the assembly, providing symmetrical support structures. The spring tensioner curve 002 may extend from each retention brace 001, creating curved sections that contribute to the device's tensioning mechanism. The slide top limiter 003 may be positioned above the component body 004, which forms a vertical extension connecting the lower elements. The object retainer spring 005 may extend from one side, transitioning into the object retainer 006 on the opposite side. This arrangement may allow for a compact and efficient design that securely attaches to framing while providing a flexible retention mechanism for various objects.

FIG. 2 illustrates an isometric view of the clip device, showcasing its three-dimensional arrangement. The retention braces 001 may be positioned at opposite ends, with spring tensioner curves 002 extending from each brace. The slide top limiter 003 may extend horizontally across the upper section of the component body 004. The object retainer spring 005 and object retainer 006 may form the lower portion of the device, creating a channel for securing objects. This three-dimensional configuration may allow for optimal force distribution and adaptability to different framing profiles, enhancing the device's versatility and stability.

FIG. 3 presents an exploded view of the clip device, revealing the spatial relationship between its components. The retention brace 001, spring tensioner curve 002, slide top limiter 003, component body 004, object retainer spring 005, and object retainer 006 are shown separated to illustrate their individual forms and how they fit together. This exploded view may aid in understanding the device's assembly process and the function of each component, potentially facilitating easier manufacturing and maintenance procedures.

Figure 4:
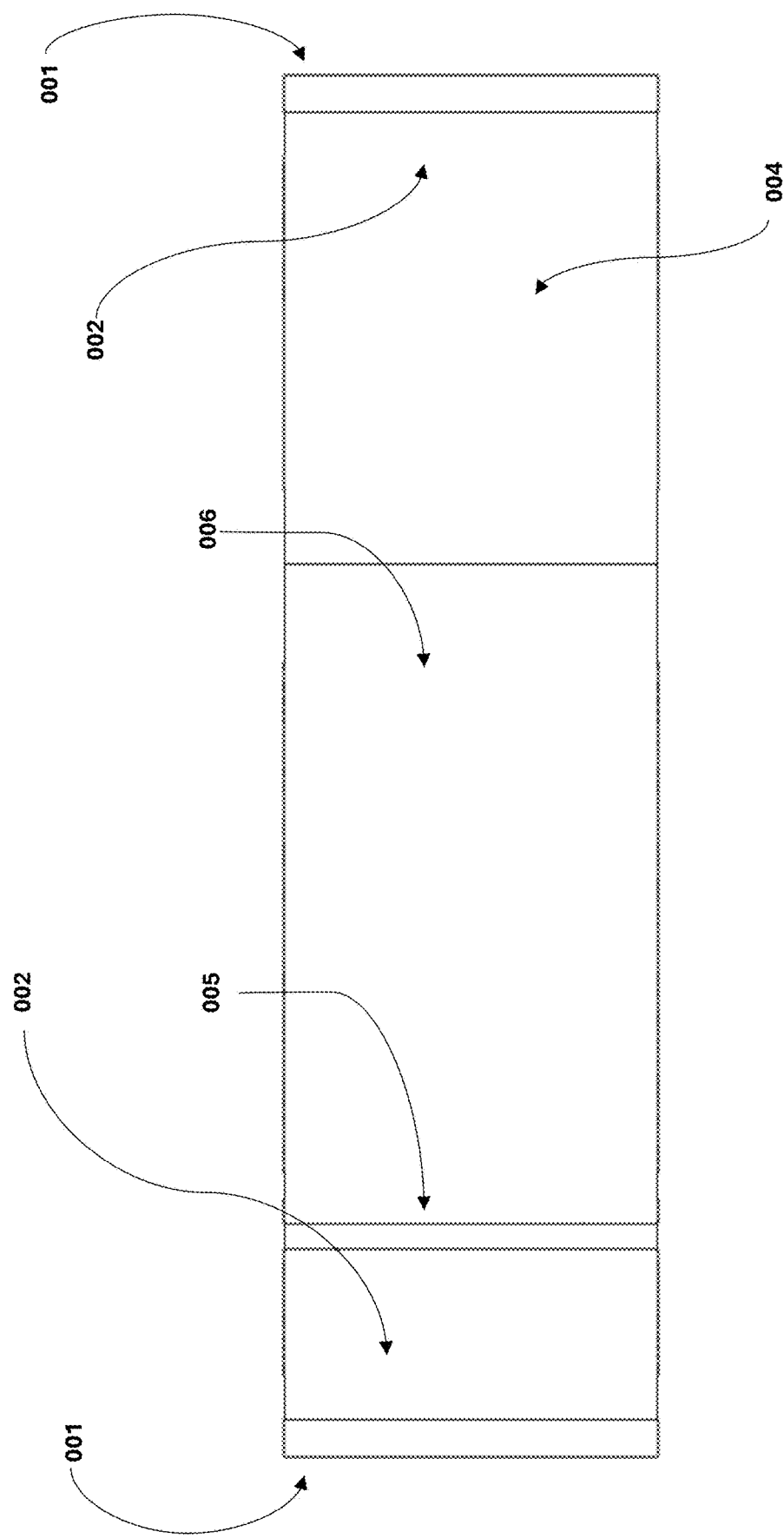
FIG. 4. An orthogonal bottom view of the clip device showing the clip device to hold objects.

In FIG. 4, an orthogonal side view of the clip device shows its components in a flattened configuration. The component body 004 forms the main horizontal structure, with retention braces 001 and spring tensioner curves 002 at each end. The object retainer spring 005 and object retainer 006 extend from opposite sides of the component body 004. This flattened view may provide insight into the device's profile when installed, showcasing its low-profile design that may minimize visual obstruction in screen enclosures.

Figure 5:
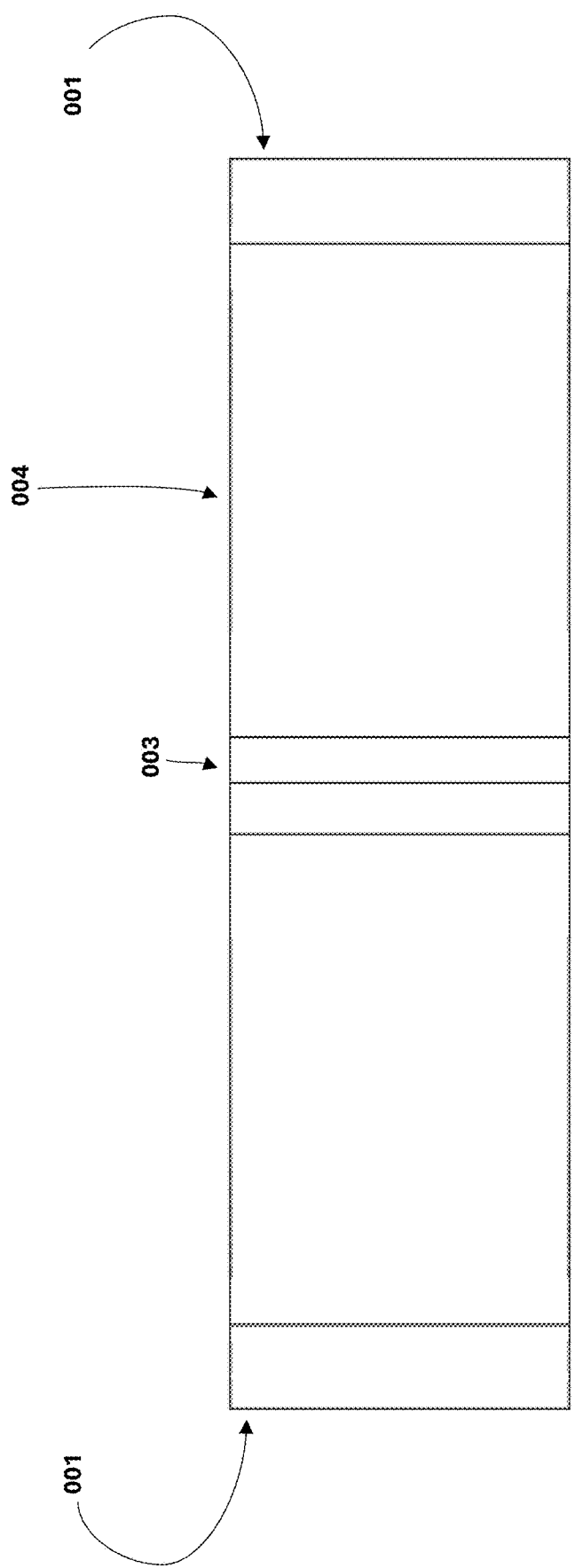
FIG. 5. An orthogonal top view of the clip device showing the side with the slide stop limiter.

FIG. 5 illustrates an orthogonal side view of the clip device in an installed configuration. The component body 004 is seated within a framing channel, with the retention braces 001 and spring tensioner curves 002 engaged against the inner surfaces of the channel. The slide top limiter 003 may be depicted resting against the upper edge of the framing channel, preventing downward movement of the device. The object retainer spring 005 and object retainer 006 may extend below the framing channel, forming an accessible retention area for hanging objects. This installed view may demonstrate how the device's components interact with the framing structure to provide a secure and stable mounting solution while maintaining a low profile within the screen enclosure.

FIG. 6 depicts an orthogonal side view of the installation tool. The angled tool head assembly 008 extends outward at an angle from the main body, with the clip device retainer 009 located at its end. The clip device retention wall 010 and clip device retention stop 012 are positioned to guide and secure the clip device during installation. The clip device installation tool body 013 forms the main vertical structure. This angled design may allow for easier access to framing channels, especially in tight or hard-to-reach areas of screen enclosures.

FIG. 7 provides an isometric view of the installation tool, showing the spatial arrangement of its components. The angled tool head assembly 008 includes the clip device retainer 009, clip device retention walls 010, clip device retention channel 011, and clip device retention stop 012. This configuration may offer precise control during clip device installation, potentially reducing the risk of misalignment or damage to the framing or clip.

FIG. 8 presents a top orthogonal view of the installation tool assembly. The circular base structure of the angled tool head assembly 008 contains the clip device retainer 009, clip device retention walls 010, clip device retention channel 011, and clip device retention stop 012. This top-down view may help users understand the tool's orientation and functionality, potentially improving ease of use and installation accuracy.

FIG. 9 illustrates an orthogonal side view of the installation tool assembly. The angled tool head assembly 008 connects to the clip device installation tool body 013, with the clip device retainer 009 extending from the top and clip device retention walls 010 on the sides. This side view may demonstrate the tool's ergonomic design, potentially enhancing user comfort during extended installation sessions.

FIG. 10 shows an isometric view of the complete installation tool assembly. The angled tool head assembly 008 integrates the clip device retainer 009, clip device retention walls 010, clip device retention channel 011, and clip device retention stop 012. The clip device installation tool body 013 extends downward, providing a grip area. This comprehensive view may illustrate how all components work together, potentially aiding in user understanding and efficient operation of the tool.

FIG. 11 depicts an orthogonal side view of the clip device in a modified configuration. The retention braces 001, spring tensioner curves 002, slide top limiter 003, and component body 004 maintain their positions, but the object retainer spring 005 and object retainer 006 are oriented perpendicular to the component body 004. An installation slot 007 is introduced between the object retainer spring 005 and component body 004. This modified design may offer increased versatility in mounting options and compatibility with the installation tool.

FIG. 12 presents an isometric view of the clip device with its components arranged in three dimensions. The retention braces 001, spring tensioner curves 002, slide top limiter 003, component body 004, object retainer spring 005, and object retainer 006 are shown in their spatial relationships. This view may help users visualize how the device integrates with framing structures and retains objects, potentially aiding in proper installation and use.

FIG. 13 illustrates another isometric view of the clip device, focusing on the perpendicular orientation of the object retainer spring 005 and object retainer 006. The installation slot 007 is clearly visible between the object retainer spring 005 and component body 004. This configuration may allow for alternative mounting options and improved compatibility with a wider range of objects, potentially increasing the device's adaptability to various screen enclosure applications.

Figure 14:
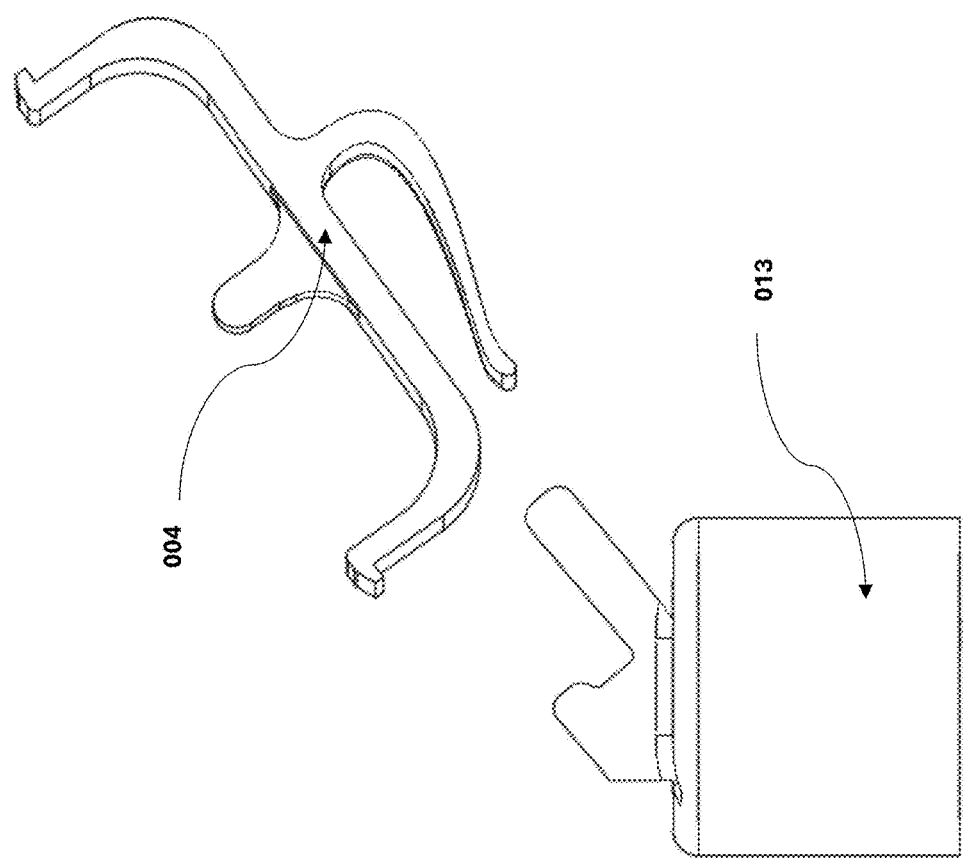
FIG. 14. An orthogonal side view of the clip device with an integrated locking mechanism, according to aspects of the present disclosure.

FIG. 14 illustrates an orthogonal side view of the clip device installed on a framing channel. The retention brace 001 may be shown engaged with the inner surface of the framing channel, providing a secure attachment point. The spring tensioner 002 may be depicted in a compressed state, exerting force against the framing channel to maintain the device's position. The slide stop limiter 003 may be shown resting against the upper edge of the framing channel, preventing downward movement of the device. The component body 004 may extend through the framing channel, with the object retainer spring 005 and object retainer 006 positioned below the framing channel to create a retention area for hanging objects. This view may demonstrate how the device's components interact with the framing structure to provide a stable and low-profile mounting solution.

Figure 15:
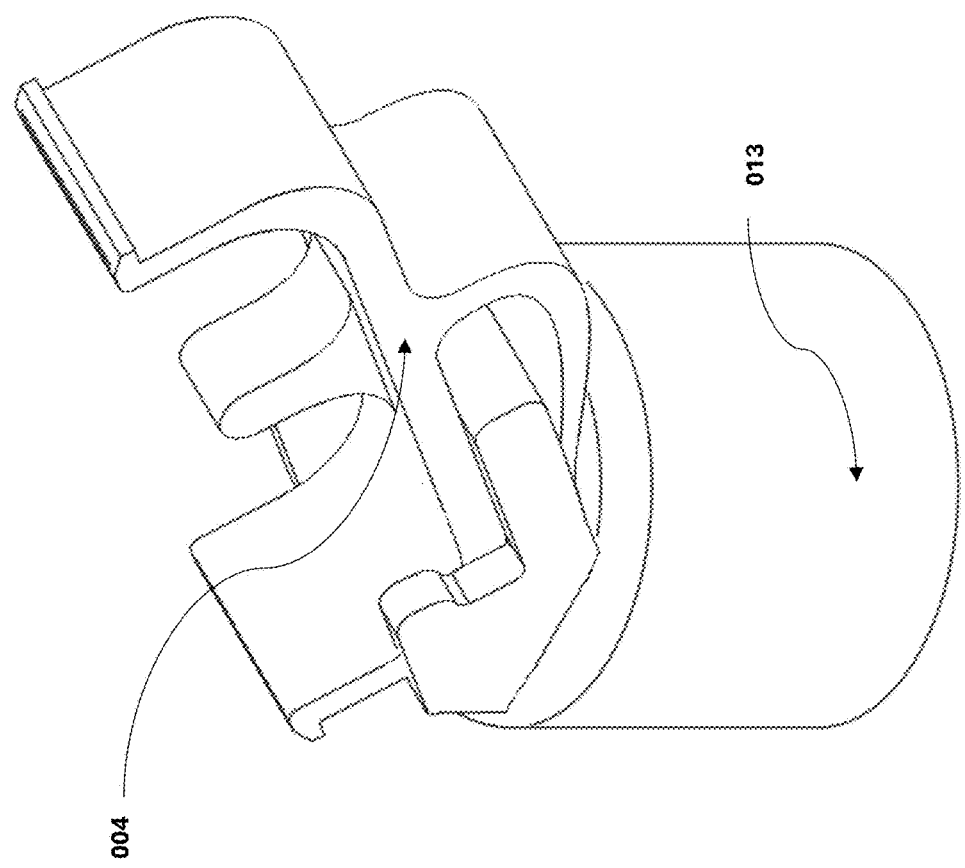
FIG. 15. An isometric view of the clip device showing the locking mechanism in an engaged position, according to an embodiment.
Figure 16:
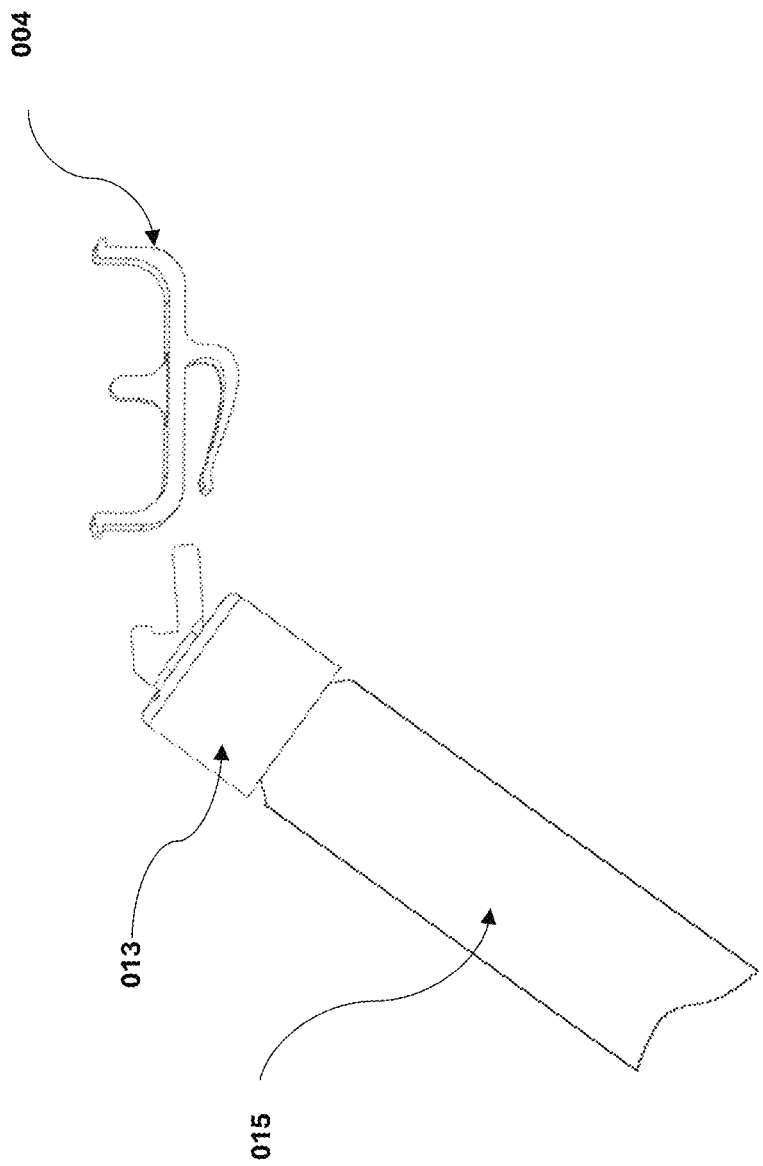
FIG. 16. A view of the installation tool attached to an extension tool ready to receive an object clip device.

FIG. 15. An isometric view of the clip device showing the locking mechanism in an engaged position, according to an embodiment. The clip device slides onto and locks into position. In FIG. 16 an example extension tool is shown inserted into the installation too and ready to receive a clip device.

Figure 17:
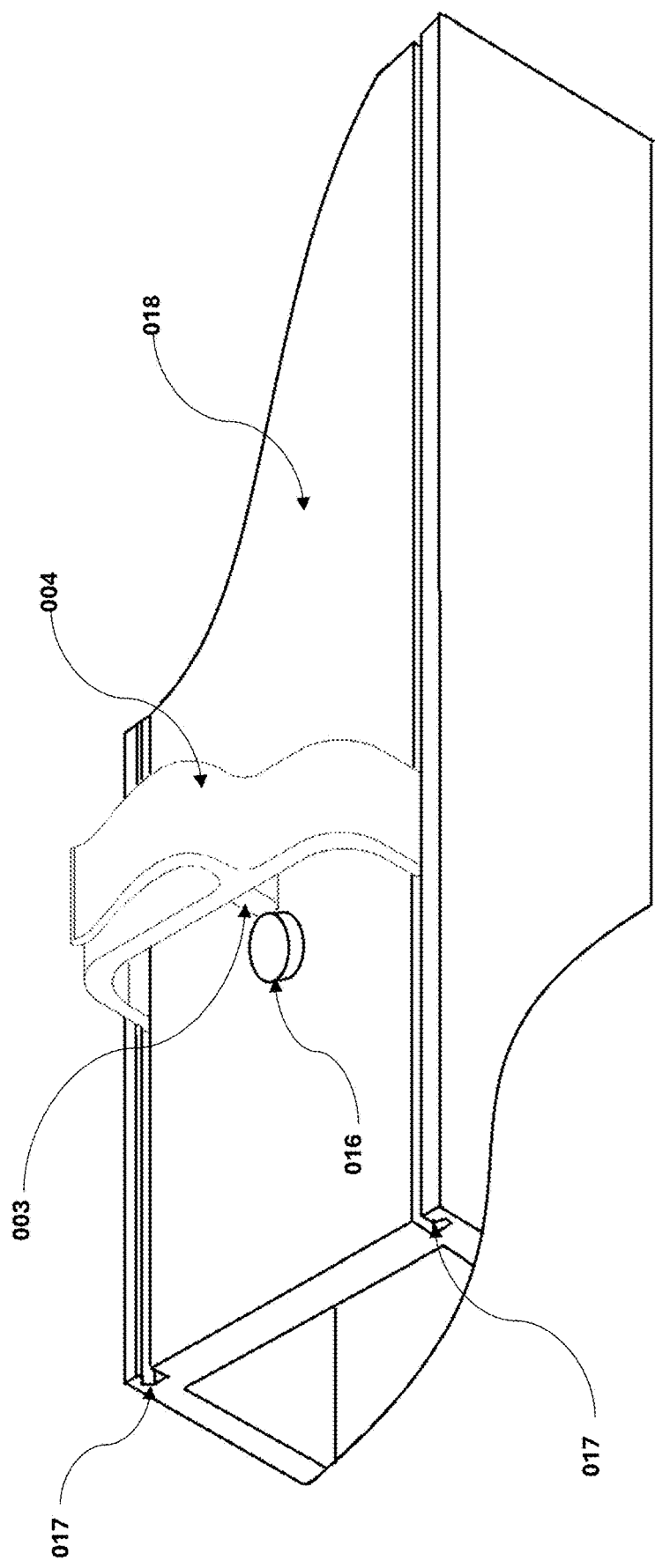
FIG. 17. A cross-sectional view of the retention device installed on an aluminum framing channel, illustrating the engagement between the clip components and the framing structure, according to aspects of the present disclosure.

FIG. 17 illustrates a cross-sectional view of a typical application of the clip device within an aluminum framing structure of a screen enclosure. The aluminum framing 018 may comprise a hollow rectangular profile with parallel channels 017 running along its length. These channels 017 may serve multiple purposes, including providing structural integrity to the framing and offering attachment points for various components.

In this figure, a fastener 016, such as a screw or bolt, may be shown penetrating the upper surface of the aluminum framing. This fastener may secure the framing to other structural elements of the screen enclosure or attach additional components to the framing itself.

The parallel channels 017 within the aluminum framing may be depicted as recessed areas along the inner surfaces of the framing. These channels 017 may vary in width and depth depending on the specific framing design, but they typically run the entire length of the framing element.

The clip device may be shown inserted into one of these parallel channels 017. The retention brace of the device may engage with the edges of the channel, providing a secure grip. The spring tensioner 002 may be depicted in a compressed state, exerting force against the inner surfaces of the channel to maintain the device's position.

The component body 004 of the clip device may extend through the channel 017, with the object retainer spring 005 and object retainer 006 positioned below the framing. This configuration may allow for objects to be hung from the device while maintaining a low profile within the framing structure.

The slide stop limiter 003 of the clip device may be shown resting against the upper edge of the channel 017 or in contact with the fastener 016. This interaction may prevent the clip device from sliding downward within the channel 017, especially in applications where the framing is oriented vertically or at an angle.

The figure may also depict how the clip device adapts to the specific dimensions of the framing channel 017. The spring tensioner may compress to different degrees based on the channel width, potentially demonstrating the device's versatility across various framing profiles.

In some cases, multiple clip devices inserted into different channels 017 of the same framing 018 allows for hanging and securing multiple objects along the length of the framing 018.

Those skilled in the art to which this application relates will appreciate that other and further additions, deletions, substitutions and modifications may be made to the described embodiments.

Those skilled in the art will appreciate the multiple ways the clip device and installation tool can be manufactured using 3D printing technology for creating single or customized instances. Materials such as ABS, PLA, PETG, or nylon are recommended for their balance of durability, flexibility, and lightweight properties. The 3D printer can be configured to print components in a layer-by-layer process with high precision, ensuring intricate features like the retention braces, spring tensioner curves, and installation slot are accurately formed. This method allows for rapid prototyping and enables adjustments to the design to accommodate specific framing profiles or aesthetic preferences. Each piece can be printed as an independent unit, ready for direct use or minor post-processing, such as smoothing or trimming.

Furthermore, those skilled in the art will appreciate large-scale production of the clip device and installation tool, and recognized injection molding is a method. This process involves creating steel or aluminum molds that define the shape and features of each component. The molds are designed to replicate the detailed elements of the devices, such as the angled tool head assembly and clip retention channel, ensuring consistency across high volumes. The molds are precision-machined based on CAD models of the devices. Materials such as polypropylene, polycarbonate, or ABS are melted and injected into the molds under high pressure. These materials offer excellent strength, weather resistance, and the flexibility required for the spring tensioner curves and object retainers. The injection molding process includes a cycle of injecting, cooling, and ejecting the parts. Multiple molds can be used in parallel to increase production speed. Advanced cooling systems ensure rapid solidification of the plastic, reducing production times while maintaining high quality. After ejection, the parts may undergo minor finishing processes like trimming of excess material (flash) or surface treatments for aesthetic enhancements, such as texturing or color application.

Furthermore, those skilled in the art will appreciate that once manufactured, the clip devices and installation tools can be packaged in different quantities, tailored to customer needs. For small retail sales, individual clip devices or installation tools can be sealed in clear plastic bags with instructions and branding. These are ideal for DIY enthusiasts or homeowners needing only a few units. Larger quantities, such as 25, 50, or 100 units, can be packaged in durable cardboard boxes with internal dividers to prevent damage during transport. Each box may include a single installation tool for convenience. For a unique packaging approach, the clip devices can be molded as interconnected pieces on a single plastic sprue, similar to hobbyist model kits. This presentation reduces packaging volume and allows end-users to detach the parts as needed. Such packaging appeals to DIY customers and emphasizes the modular nature of the product.

The specification is not to be taken in a limiting sense but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the description to provide a thorough understanding of the invention.

These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specifications, and are to be considered a portion of the entire written description of this invention. As used in the preceding description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly", and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

What is claimed:

1. A method of installing a clip device on an extruded aluminum structural member of a screen enclosure, the method comprising: providing a clip device comprising a component body, at least one retention brace extending from the component body, a spring tensioner adjacent to the retention brace, and an object retainer; inserting the clip device into a clip retainer of an installation tool comprising an angled tool head assembly; positioning the installation tool adjacent to a channel of the extruded aluminum structural member; and pressing the clip device into the channel such that the retention brace and spring tensioner engage opposing interior surfaces of the channel, and the object retainer extends below the channel to form a retention area for hanging an object.

2. The method of claim 1, wherein the angled tool head assembly is removably attachable to an extension pole to facilitate installation at elevated or hard-to-reach locations.

3. The method of claim 1, further comprising aligning a slide top limiter of the clip device with an upper edge of the channel to restrict downward movement after installation.

4. The method of claim 1, wherein the installation tool comprises at least one clip retention wall and a clip retention stop, and the method further comprises guiding the clip device between the retention walls and preventing rearward movement of the clip device with the clip retention stop.

5. The method of claim 1, further comprising installing a plurality of the clip devices along a length of the extruded aluminum structural member to support multiple hanging objects.

6. The method of claim 1, further comprising detaching the installation tool after the clip device is secured in the channel.

7. The method of claim 1, wherein the object retainer comprises an object retainer spring and an object retainer body oriented substantially parallel to a longitudinal axis of the component body.

8. The method of claim 1, wherein the step of positioning the installation tool comprises positioning it at a height between approximately 1 foot and 30 feet above ground level.

9. The method of claim 1, wherein the clip device is color-matched to a surface color of the screen enclosure.

10. The method of claim 1, wherein pressing the clip device into the channel comprises: compressing the spring tensioner during insertion; and allowing the spring tensioner to expand within the channel to secure the clip device.

11. The method of claim 1, further comprising engaging a slide top limiter of the clip device with a fastener on the extruded aluminum structural member to prevent sliding movement.

12. The method of claim 1, wherein the clip device has a length between approximately 1 inch and 6 inches.

13. The method of claim 1, wherein the clip device is constructed from a material selected from the group consisting of polypropylene, high-density polyethylene, polystyrene, polyethylene, high-impact polystyrene, polyvinyl chloride, acrylic, acrylonitrile butadiene styrene, polycarbonate, nylon, polyurethane, polyetherimide, polyether ether ketone, and polyphenylene sulfide.

14. The method of claim 1, wherein the object comprises a decorative light.

* * * * *